(12) United States Patent
Terashima et al.

(10) Patent No.: US 10,630,158 B2
(45) Date of Patent: Apr. 21, 2020

(54) ACTIVE VIBRATION CONTROLLER

(71) Applicant: HONDA MOTOR CO., LTD., Tokyo (JP)

(72) Inventors: Osamu Terashima, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 436 days.

(21) Appl. No.: 15/589,290

(22) Filed: May 8, 2017

(65) Prior Publication Data
US 2017/0331357 A1  Nov. 16, 2017

(30) Foreign Application Priority Data
May 11, 2016  (JP) .................................. 2016-095318

(51) Int. Cl.
*H02K 33/02* (2006.01)
*F16F 1/36* (2006.01)
*F16F 15/03* (2006.01)

(52) U.S. Cl.
CPC ............. *H02K 33/02* (2013.01); *F16F 1/361* (2013.01); *F16F 1/3615* (2013.01); *F16F 15/03* (2013.01)

(58) Field of Classification Search
CPC ........... H02K 33/02; F16F 15/03; F16F 1/361
USPC ......................................................... 310/51
See application file for complete search history.

(56) References Cited

U.S. PATENT DOCUMENTS

| 9,109,654 B2* | 8/2015 | Hiemenz ................. F16F 9/535 |
| 2002/0074881 A1* | 6/2002 | Imlach ..................... F16C 27/06 310/90.5 |
| 2009/0133976 A1* | 5/2009 | Bose ........................ F16F 9/535 188/267.2 |

(Continued)

FOREIGN PATENT DOCUMENTS

| CN | 104482091 A | 4/2015 |
| JP | 2001-200936 A | 7/2001 |

(Continued)

OTHER PUBLICATIONS

Chinese Office Action with English translation dated Apr. 18, 2019, 14 pages.

(Continued)

*Primary Examiner* — Hanh N Nguyen
(74) *Attorney, Agent, or Firm* — Rankin, Hill & Clark LLP (57) ABSTRACT

An active vibration controller includes: a housing; a first magnetic member on the housing, the first magnetic member including a first tip portion extending from a first base end of the first magnetic member and including a first connecting surface extending from the base end on the first tip portion; a movable member including a second magnetic member including a second tip portion extending from a second base end of the second magnetic member and a second connecting surface extending from the second base end on the second tip portion; an exciting coil; a magnetic viscoelastic elastomer having a magnetic viscoelastic property varying according to a magnetic field magnitude between the first and second tip portions, and connects the first connecting surface to the second connecting surface. The first and second tip portions are thinner than the first and second base ends, respectively.

14 Claims, 5 Drawing Sheets

(56) References Cited

U.S. PATENT DOCUMENTS

2013/0127098 A1     5/2013   Kim et al.
2015/0228267 A1*   8/2015   Inoue .................. G10K 11/175
                                                                        381/71.4

FOREIGN PATENT DOCUMENTS

| JP | 2001-317584 A | 11/2001 |
| JP | 2009-300196 A | 12/2009 |
| WO | 2012-026332 A1 | 3/2012 |

OTHER PUBLICATIONS

Japanese Office Action with English Translation dated Feb. 27, 2018, 4 pages.

* cited by examiner

ACTIVE VIBRATION CONTROLLER

CROSS REFERENCE TO RELATED APPLICATION

This application claims the foreign priority benefit under Title 35, United States Code, § 119(a)-(d) of Japanese Patent Application No. 2016-095318, filed on May 11, 2016 in the Japan Patent Office, the disclosure of which is herein incorporated by reference in its entirety.

BACKGROUND OF THE INVENTION

1. Field of the Invention

The present invention relates to an active vibration controller.

2. Description of the Related Art

In the conventional passive-type absorbers, an eigenvalue of the vibration absorber is uniquely determined because a physical property of the configuration elements is fixed. Accordingly, when a frequency of the disturbance vibration agrees with the eigenfrequency of the absorber, a high damper effect is given. However, when the frequency of the disturbance vibration is different from the eigenfrequency even slightly or when the frequency of the disturbance vibration varies as time passes, i.e., in an unstable state, the damper effect of the dynamic absorber cannot be fully given. Regarding this problem, a method of designing an optimal tuning and optimal damping to keep a damping effect over a certain frequency band is known. However, its damping effect is insufficient.

On the other hand, as a counter part of the passive type of damping device, an active mass damper is known. In this method, an actuator for forcibly vibrating a mass is installed in addition to the mass element. This provides a high damping effect irrespective of stable or unstable in frequency because, theoretically, an arbitrary damping force can be generated though any disturbance is applied. However, there are problems in that a device to directly apply outer energy becomes complicated, that a control system designing become necessary to avoid unstableness, and that a cost is high. Further, there is a semi-active type of a control method which is intermediate type between the passive type and the active type. In the semi-active type of damper, a physical characteristic of one of configuration elements, which is originally fixed in the passive type system, is made variable with some means to have variability in the physical characteristic in the system. This enables the system control while the variation due to a disturbance is tracked to some extent. The semi-active type of control method has advantageous effects such as a control performance close to the active type of control method with reliability and stability derived from the passive elements and provides a device at a cost which is lower than that of the active type of control.

WO 2012/026332 disclosed a configuration for varying an elastic modulus of a magnetic elastic body by application of a magnetic field generated by an exciting coil using a configuration in which the exciting coil is arranged around an outer circumference of a magnetic elastic body of which elastic modulus can be changed by application of a magnetic field by the exciting coil.

In WO 2012/026332, it is disclosed that a stiffness of a magnetic viscoelastic elastomer is changed by application of a magnetic field to the magnetic response-type elastic body (magnetic viscoelastic elastomer) is changed. When the magnetic field is applied to the magnetic viscoelastic elastomer, the magnetic field is applied to the magnetic viscoelastic elastomer uniformly and varies the stiffness of the magnetic viscoelastic elastomer in accordance with the application quantity of the magnetic field.

However, in the technology disclosed in WO 2012/026332, it was forced to distribute magnetic powder to a part which does not largely contribute to change the stiffness of the magnetic viscoelastic elastomer. This results in increase in a lower limit of a base stiffness of the magnetic viscoelastic elastomer because a larger amount of the magnetic powder must be distributed to the part that does not contribute to variation in the stiffness, which may result in increase in the lower limit of the stiffness of the magnetic viscoelastic elastomer and increase in the manufacturing cost. Further, the magnetic field cannot be applied to the magnetic viscoelastic elastomer efficiently because the magnetic field may be applied to the part of the magnetic viscoelastic elastomer in which the magnetic powder is not distributed. Accordingly, it was not performed to apply the magnetic field to the magnetic viscoelastic elastomer efficiently.

SUMMARY OF THE INVENTION

An aspect of the present invention provides arrangement of the magnetic powder in the concentrated manner in a part which largely contributes to vary the stiffness of the magnetic viscoelastic elastomer, and the magnetic field is in the concentrated manner applied to the part in which the magnetic powder is in the concentrated manner arranged.

Accordingly, it may be required to apply the magnetic field in the concentrated manner to the target part of the magnetic viscoelastic elastomer.

An aspect of the present invention provides an active vibration controller which can apply the magnetic field in the concentrated manner to the target part of the magnetic viscoelastic elastomer.

An aspect of the present invention provides an active vibration controller comprising:

a housing;

a first magnetic member installed on the side of the housing, the first magnetic member including a first tip portion extending from a first base end of the first magnetic member and including a first connecting surface extending from the first base end on the first tip portion;

a movable member including a second magnetic member including a second tip portion extending from a second base end of the second magnetic member and a second connecting surface extending from the second base end on the second tip portion;

an exciting coil that generates a magnetic field in accordance with an intensity of a current supplied thereto;

a magnetic viscoelastic elastomer that has a magnetic viscoelastic property varying in accordance with a magnitude of the magnetic field from the exciting coil between the first and second tip portions, and connects the first connecting surface to the second connecting surface, wherein the first and second tip portions are thinner than the first and second base ends, respectively.

According to the present invention, the active vibration controller which can apply the magnetic field in the concentrated manner to the target part of the magnetic viscoelastic elastomer may be provided.

An aspect of the present invention provides the active vibration controller, wherein the first magnetic member includes a first end face on the first base end on a side of the first tip portion and the first tip portion includes a first top portion protruding from the first end face toward the side of the second tip portion.

According to the present invention, a magnetic field can be applied to the magnetic viscoelastic elastomer in the concentrated manner from a tip of the first tip.

In this case, the second magnetic member may include a second end faces on the second base end on a side of the second tip and the second tip portion includes a second top portion protruding from the second end face toward the side of the first tip portion.

According to the present invention, the magnetic field can be applied in the concentrated manner between the first top portion and the second top portion.

In this case, the first and second top portions may face each other.

According to the present invention, it is possible to transmit the magnetic field linearly and in the concentrated manner between the first and second top portions.

In this case, the first connecting surface may include a first protruding portion protruding from the first base end toward the second tip portion as the first connecting surface.

According to the present invention, it is possible to apply the magnetic field to the magnetic viscoelastic elastomer in the concentrated manner from a tip of the first protruding part.

In this case, the first protruding portion may have a curved shape at a surface thereof.

According to the present invention, it is possible to apply the magnetic field to the magnetic viscoelastic elastomer in the concentrated manner from a tip of the curved shape of the first top.

In this case, the second tip portion may include a second protruding portion protruding from the second base end toward the first tip portion as the second connecting surface.

According to the present invention, it is possible to apply the magnetic field in the concentrated manner between the first and second protruding parts.

In this case, the first protruding portion and the second protruding portions may face each other.

According to the present invention, it is possible to transit the magnetic field in the concentrated manner and linearly between the first protruding part and second protruding part.

In this case, the first magnetic member and the second magnetic member have shapes at the first and second tip portions on cross sections taken along the transmission direction of the magnetic flux have trapezoid shapes in which both tips are tapered.

According to the present invention, it is possible to transit the magnetic field in the concentrated manner through the magnetic viscoelastic elastomer from a tip of the trapezoid shape.

An aspect of the present invention provides an active vibration controller which can apply the magnetic field to the target part in the magnetic viscoelastic elastomer in the concentrated manner.

DETAILED DESCRIPTION OF THE INVENTION

First Embodiment

A first embodiment of the present invention is described below in detail, referring to the attached drawing.

Figure 1:
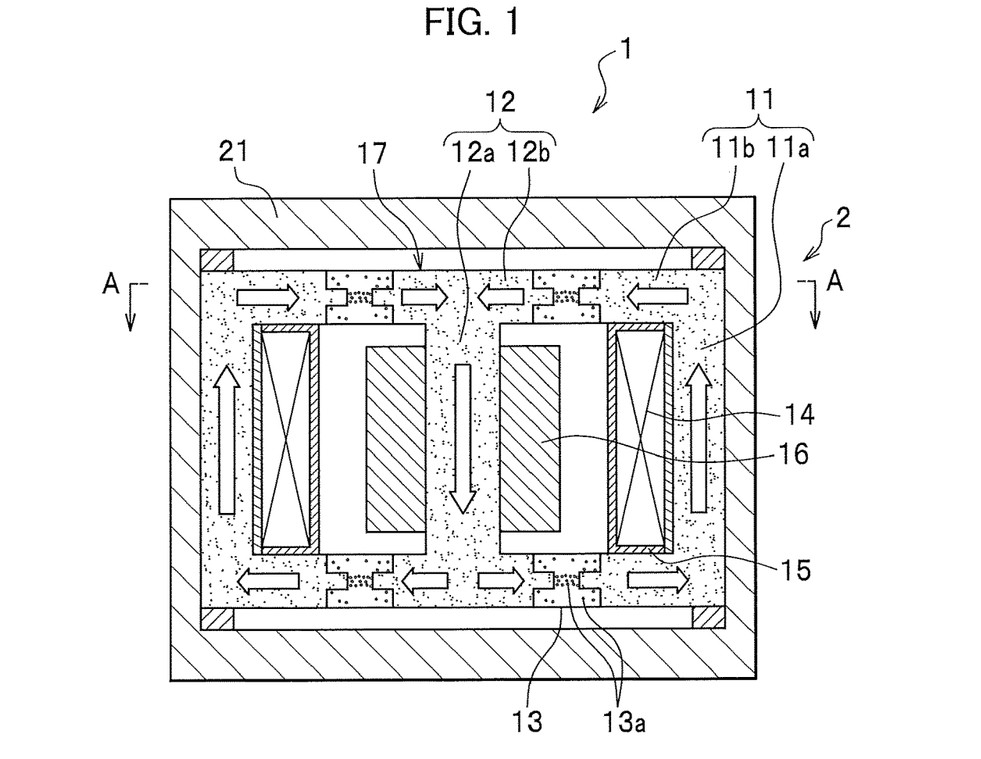
FIG. 1 is an elevational sectional view of the active vibration controller according to a first embodiment of the present invention.
Figure 2:
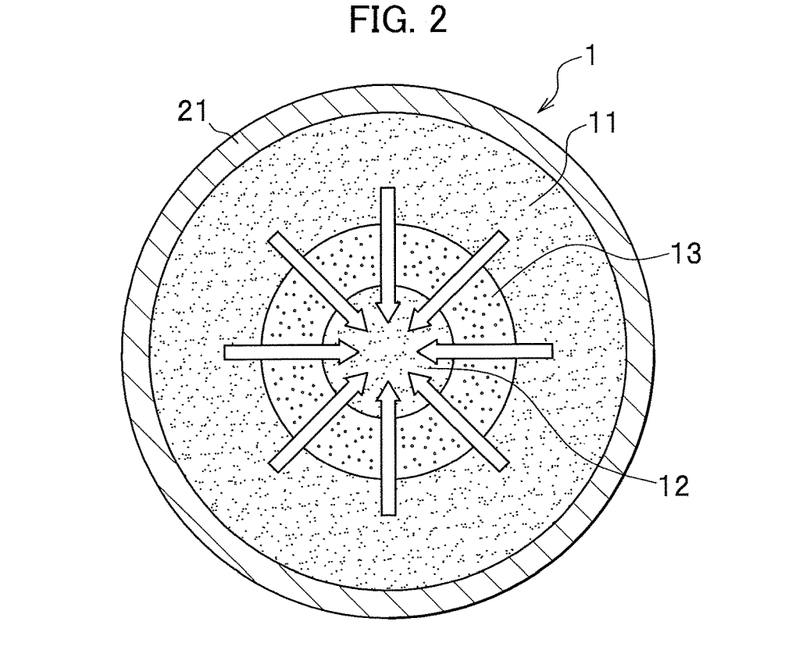
FIG. 2 is a sectional view of the active vibration controller, taken along a line A-A in FIG. 1.

FIG. 1 is an elevational sectional view of the active vibration controller according to the first embodiment of the present invention, and FIG. 2 is a sectional view of the active vibration controller, taken along a line A-A in FIG. 1.

An active vibration controller 1 includes a housing 21 having a non-magnetic hollow circular cylinder. The housing 21 houses a movable part 17 which can move in response to an input force from the outside and a first magnetic core 11. The movable part 17, disposed inside the first magnetic core 11, includes a second magnetic core 12 and an adjusting mass 16. Further, the housing 21 houses an exciting coil 14 for generating a magnetic field having intensity according to the current supplied thereto. The exciting coil 14 is made by winding a wire around a bobbin 15 having an annular shape.

The first magnetic core (first magnetic member) 11 and the second magnetic core (second magnetic member) 12 are a plurality of (two in this example) magnetic members forming a closed magnetic field circuit having an annular shape (indicated with blank arrows) through which the magnetic field generated by the exciting coil 14 transmits.

The second magnetic core 12 forms the movable part 17 and includes a pillar 12a extending in an axial direction of a hollow circular cylinder 11a and a second extending part 12b extending from the pillar 12a toward an outside of the circumferential direction of the pillar 12a.

The first magnetic core 11 includes the hollow circular cylinder 11a disposed between the housing 21 and the exciting coil 14, and an extending part 11b extending from the hollow circular cylinder 11a toward inside regarding a circumferential direction.

A magnetic viscoelastic elastomer (magnetic response-type elastic body (MRE)) 13 is arranged to form the closed magnetic circuit in which the first magnetic core 11 is connected to the second magnetic core 12 at at least one part (two parts in this example). More specifically, the magnetic viscoelastic elastomer 13 is connected to the first magnetic core 11 and the second magnetic core 12 therebetween in a direction perpendicular to a movable direction of the movable part 17 (in a horizontal direction in FIG. 1). The magnetic viscoelastic elastomer 13 is arranged annularly to connect an internal end of the extending part 11b to an outer end of the second extending part 12b.

In this example, when the exciting coil 14 is excited, as shown with the blank arrows, a magnetic flux transmits through a closed magnetic circuit starting from the hollow circular cylinder 11a via the extending part 11b, the magnetic viscoelastic elastomer 13, the second extending part 12b, the pillar 12a, and the second extending part 12b, and returns to the extending part 11b through the magnetic viscoelastic elastomer 13.

The magnetic viscoelastic elastomer 13 is a member of which viscoelastic property varies in accordance with an intensity of the magnetic field generated by the exciting coil 14. More specifically, the magnetic viscoelastic elastomer 13 comprises an elastic material such as a rubber, etc. into which magnetic particles 13a such as iron power is doped and has a property in which a stiffness becomes high when the magnetic field generated by the exciting coil 14 has a high intensity (described in detail later).

The adjusting mass 16 is provided on an outer circumference of the pillar 12a as a mass member which is non-magnetic material forming the movable part 17.

Figure 3:
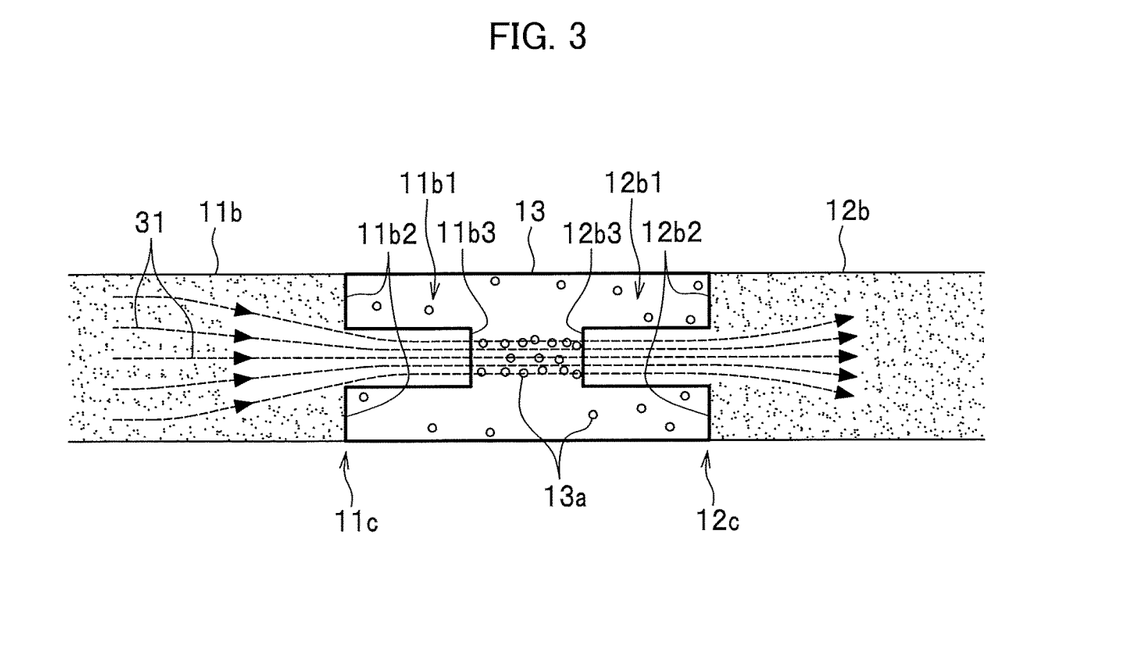
FIG. 3 is a partially-enlarged elevational sectional view to show a part in which a first extending part, a second extending part of the active vibration controller, and a magnetic viscoelastic elastomer elastically connecting the first and second extending parts in the active vibration controller according to a first embodiment.

FIG. 3 is a partially-enlarged elevational sectional view to show a part in which the first extending part 11b and the second extending part 12b are connected with the magnetic viscoelastic elastomer 13. The extending part 11b is a part of the first magnetic member 11, and a second magnetic extending part 12b is a part of a second magnetic member 12. The first extending part 11b includes a first top portion 11b3 protruding from the first base end 11c toward the second extending part 12b as the first tip portion of the first magnetic member. The second extending part 12b includes a second top portion 12b3 protruding from the second base end 12c toward the first extending part 11b as the second tip portion of the second magnetic member 12.

A first connecting surface 11b1 is on the first top portion 11b3 which is a tip portion of the first magnetic member 11, and includes a side surface and a top surface of the first top portion 11b3, i.e., the first connecting surface 11b1 covers the first top portion 11b3. A second connecting surface 12b1 is on the second top portion 12b3 which is a tip portion of the second magnetic member 12, and includes a side surface and a top surface of the top portion 12b3, i.e., the second connecting surface 11b1 covers the second top portion 11b3. The first connecting surface 11b1 on the first tip portion of the first magnetic member 11 and the second connecting surface 12b1 on the second tip portion of the second magnetic member 12 are connected to the magnetic viscoelastic elastomer 13 from the left part and the right part, respectively. The first tip portion (first top portion 11b3) of the first magnetic member (the extending part 11b) and the second tip portion (second top portion 12b3) of the second magnetic member (the extending part 11b) are formed thinner than parts of the first and second magnetic members 11 and 12 at the first and second base ends 11c and 12c, respectively.

In addition, the end face 11b2 may be further connected to the magnetic viscoelastic elastomer 13. The end face 12b2 at a side of the tip may be further connected to the magnetic viscoelastic elastomer 13. The first top portion 11b3 and a second top portion 12b3 oppositely face each other.

Further, the shapes of the both ends of the magnetic viscoelastic elastomer 13 fit to the connecting surface 11b1 and the connecting surface 12b1, respectively.

The magnetic viscoelastic elastomer 13 movably supports the second magnetic member relatively to the first magnetic member in the axial direction of the pillar 12a in which the stiffness thereof is controlled by the magnetic flux transmitted therethrough and a distance of the gap between the first and second tip portions is substantially kept. The magnetic particles 13a are concentrated at a center part of the magnetic viscoelastic elastomer 13.

Figure 4:
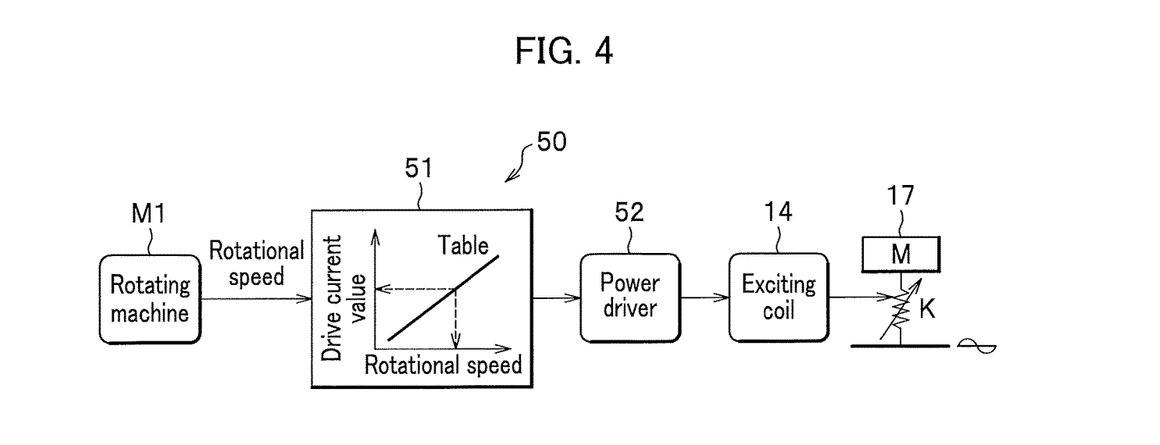
FIG. 4 is a general block diagram of a control system of the active vibration controller according to the first embodiment of the present invention.

FIG. 4 is a general block diagram of a control system 50 of the active vibration controller 1. A table 51 is used to obtain a drive current in accordance with the rotational speed of a rotating machine Ml, for example, an engine speed of the vehicle. A power driver 52 configured including semiconductor switching elements applies a drive current to the exciting coil 14. This excites the exciting coil 14 with the drive current of which intensity is determined according to the rotational speed of the rotating machine M1. The magnetic field generated by the exciting coil 14 varies in intensity in accordance with the rotational speed of the rotating machine M1, which varies the stiffness of the magnetic viscoelastic elastomer 13 having the movable part 17 (mass M), which changes a spring constant (K) of the magnetic viscoelastic elastomer 13.

Next, an operation of the active vibration controller 1 is described below.

In the active vibration controller 1, when the magnetic viscoelastic elastomer 13 vibrates in vertical direction in FIG. 1 due to generation of vibrations, a shearing force is applied to the magnetic viscoelastic elastomer 13 in the vertical direction in FIG. 1 due to the vibration generation, so that an arrangement of the magnetic particles 13a is deviated. In this state, when a magnetic field is applied thereto with the exciting coil 14, the magnetic particles 13a tend to line in the direction of the magnetic field. This resists an external force, so that the apparent stiffness of the magnetic viscoelastic elastomer 13 increases. The variation of the stiffness of the magnetic viscoelastic elastomer 13 varies a resonance frequency of the movable part 17, which changes a frequency of damping the vibrations. Because the variation in the stiffness in this case is made in accordance with the rotational speed of the engine, etc. of the vehicle as shown in the table 51, the vibrations can be suppressed efficiently in accordance with variation in the rotational speed of the engine, etc. of the vehicle.

In the first embodiment, the first connecting surface 11b1 extends from the first end face 11b2 to the tip side of the first magnetic member on the first top portion 11b3 protruding from the first end face 11b2 toward the side of the connecting surface 12b1. A size (thickness) of the magnetic members at the end faces is decreased stepwise. The second connecting surface 12b1 extends from the second end face 12b2 to the tip side of the second magnetic member 12 on the second top portion 12b3 protruding from the second end face 12b2 toward the side of the first connecting surface 11b1 in which the size (thickness) of the magnetic member 12 at the end face 12b is decreased stepwise. Accordingly, magnetic flux lines 31 transmit through the extending part 11b as the first magnetic member and the second extending part 12b as a second magnetic member such that the magnetic flux lines 31 are concentrated from the first top portion 11b3 to the second top portion 12b3, both being thin parts. At a part of the magnetic viscoelastic elastomer 13 between the first top portion 11b3 and the second top portion 12b3, the magnetic particles 13a are concentrated. The magnetic field can be applied to this position in a concentrated manner between the first top portion 11b3 and the top portion 12b3. Accordingly, the magnetic field can be applied to the magnetic viscoelastic elastomer efficiently.

Further, the first top portion 11b3 faces the second top portion 12b3 each other, which causes the magnetic field to transmit through the part between the first top portion 11b3 and the second top portion 12b3 in a concentrated and linear manner.

This can increase a variation quantity in stiffness of the magnetic viscoelastic elastomer 13. Further, the magnetic field can be applied to the magnetic viscoelastic elastomer 13 efficiently by applying a little power to the exciting coil 14.

Second Embodiment

In the embodiments after the first embodiment, only shapes of the first extending part 11b, the second extending part 12b, and the magnetic viscoelastic elastomer 13 are different from those in the first embodiment, and other elements are the same as those in the first embodiment described referring FIGS. 1, 2, and 4. Accordingly, in the embodiments after the first embodiment below, shapes of the first extending part 11b, the second extending part 12b, and the magnetic viscoelastic elastomer 13 are mainly described in addition to the operation and advantageous effects, and the general description is omitted.

The same elements or parts are designated with the like references, and a detailed description is omitted.

Figure 5:
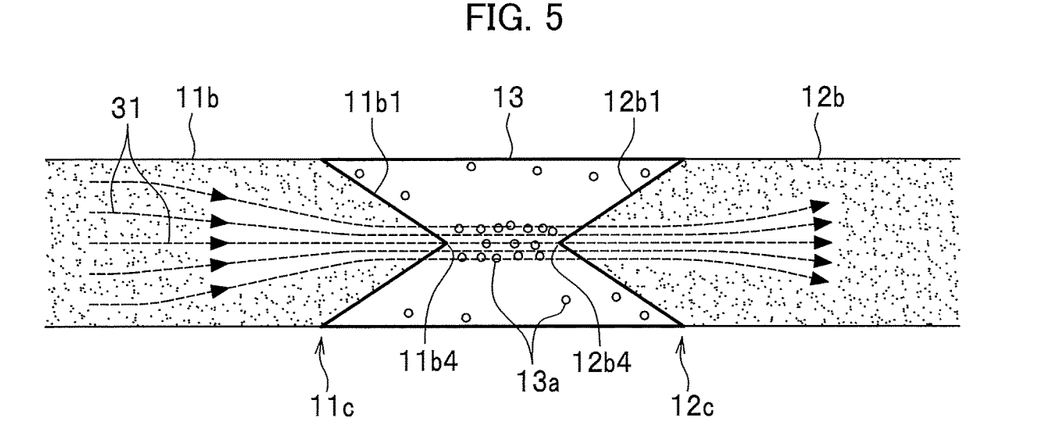
FIG. 5 is a partially-enlarged elevational sectional view to show a part in which the first extending part, the second extending part of the active vibration controller, and the magnetic viscoelastic elastomer elastically connects the first and second extending parts in the active vibration controller according to a second embodiment.

FIG. 5 is an enlarged elevational sectional view to show shapes of the first extending part 11b of the first magnetic member 11, a second extending part 12b of the second magnetic member, and a magnetic viscoelastic elastomer 13. The active vibration controller 1 of the second embodiment is different from the configuration of the first embodiment is such that the first connecting surface 11b1 includes a surface of a first protruding portion 11b4 protruding on a tip side thereof toward the second extending part 12b from the first base end 11c. The second connecting surface 12b1 has a second protruding portion 12b4 protruding on the tip side thereof toward a side of the first connecting surface 11b2 from the second base end 12c. More specifically, the first protruding portion 11b4 and the second protruding portion 12b4 have shapes on a cross section taken along the longitudinal direction, which are triangles, i.e., the first protruding portion 11b4 and the second protruding portion 12b4 have, for example, a circular cone shape, etc. The circular cone shape is continuous from the outer face of the first and second magnetic members 11 and 12 at the first and second base ends 11c and 12c. The first protruding portion 11b4 and the second protruding portion 12b4 face each other.

The magnetic flux lines 31 transmit through the first extending part 11b and the second extending part 12b while the magnetic lines are concentrated from the first protruding portion 11b4 to the second protruding portion 12b4, both protruding portions being angular. The magnetic particles 13a are arranged at a part of the magnetic viscoelastic elastomer 13 between the first protruding portion 11b4 and the second protruding portion 12b4 in the concentrated manner. Further, this position is located between the first protruding portion 11b4 and the second protruding portion 12b4, so that it is possible to apply the magnetic field to this position in the concentrated manner. This can apply the magnetic field to the magnetic viscoelastic elastomer 13 efficiently.

In addition, because the first protruding portion 11b4 and the second protruding portion 12b4 are oppositely faced each other, it is possible to transmit the magnetic field between the first protruding portion 11b4 and the second protruding portion 12b4 linearly and in the concentrated manner.

This configuration can make a variation quantity of the magnetic viscoelastic elastomer 13 larger. Accordingly, even though a small quantity of power is applied to the exciting coil 14, this can apply the magnetic field to the magnetic viscoelastic elastomer 13 efficiently.

Third Embodiment

Figure 6:
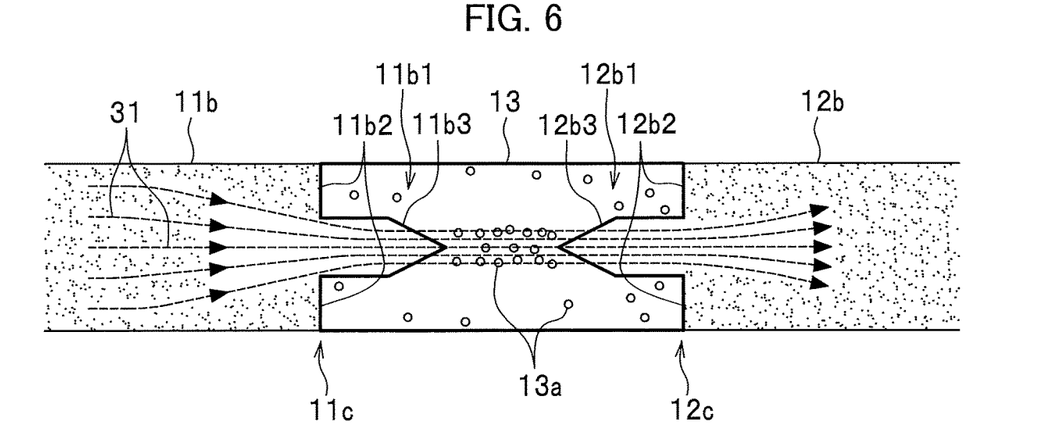
FIG. 6 is a partially-enlarged elevational sectional view to show a part in which the first extending part, the second extending part of the active vibration controller, and the magnetic viscoelastic elastomer elastically connecting the first and second extending parts in the active vibration controller according to a third embodiment.

FIG. 6 is an enlarged elevational sectional view to show shapes of the first extending part 11b, the second extending part 12b, and the magnetic viscoelastic elastomer 13. The active vibration controller 1 according to the third embodiment is different from the first embodiment in that the first top portion 11b3 and the second top portion 12b3 have shapes on cross section taken along the longitudinal direction of each of the top portions 11b3 and 12b3 which have sharp angles.

The magnetic flux lines 31 transmit through the extending part 11b and the second extending part 12b in the concentrated manner from the first top portion 11b3 to the second top portion 12b3, both being thin and sharp. The magnetic particles 13a are concentrated at the part of the magnetic viscoelastic elastomer 13 between the first top portion 11b3 and the second top portion 12b3. Further, this position is located between the first top portion 11b3 and the second top portion 12b3, so that it is possible to apply the magnetic field to this position in the concentrated manner. This can apply the magnetic field to the magnetic viscoelastic elastomer 13 efficiently.

In addition, because the first top portion 11b3 and the second top portion 12b3 are faced each other, it is possible to transmit the magnetic field between the first top portion 11b3 and the second top portion 12b3 linearly and in the concentrated manner.

This configuration can make a variation quantity in stiffness of the magnetic viscoelastic elastomer 13 larger. Accordingly, even though a small quantity of power is applied to the exciting coil 14, this can apply the magnetic field to the magnetic viscoelastic elastomer 13 efficiently.

Fourth Embodiment

Figure 7:
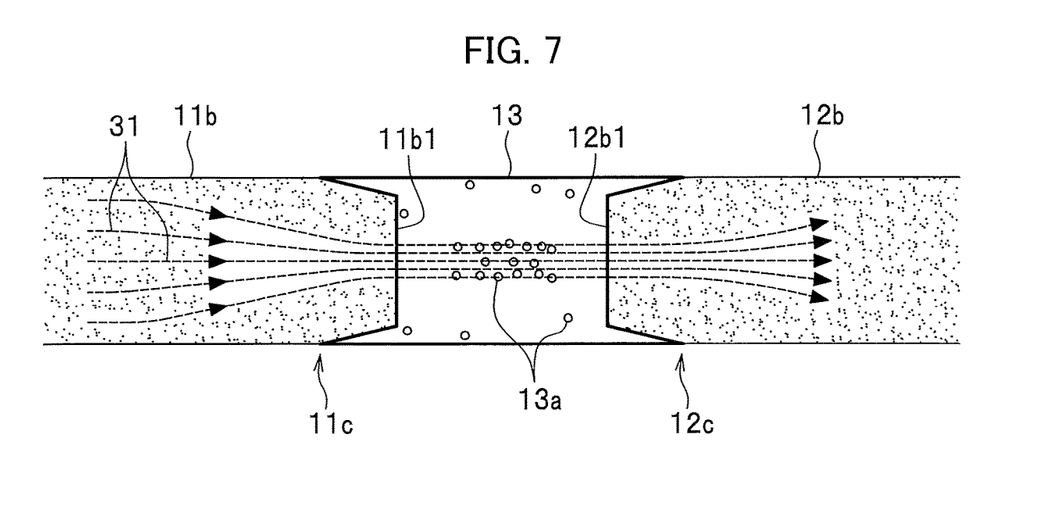
FIG. 7 is a partially-enlarged elevational sectional view to show a part in which the first extending part, the second extending part of the active vibration controller, and the magnetic viscoelastic elastomer elastically connecting the first and second extending parts in the active vibration controller according to a forth embodiment.

FIG. 7 is an enlarged elevational sectional view to show shapes of the extending part 11b, the second extending part 12b, and the magnetic viscoelastic elastomer 13 according to a forth embodiment. The active vibration controller 1 according to the fourth embodiment is different from that in the second embodiment in that the first tip portion of the first magnetic member 11b on a side of the first connecting surface 11b1 having a trapezoid shape on a cross section, taken along a direction of the magnetic flux in the extending part 11b and the second extending part 12b, and the second tip portion on the side of the second connecting surface has a trapezoid shape (tapered) on the cross section, taken along a direction of the magnetic flux in the extending part 12b.

Accordingly, it is possible to apply the magnetic field to the part in which the magnetic particles 13a are concentrated.

This configuration can make a variation quantity in stiffness of the magnetic viscoelastic elastomer 13 larger. Accordingly, even though a small quantity of power is applied to the exciting coil 14, the magnetic field can be applied to the magnetic viscoelastic elastomer 13 efficiently.

Fifth Embodiment

Figure 8:
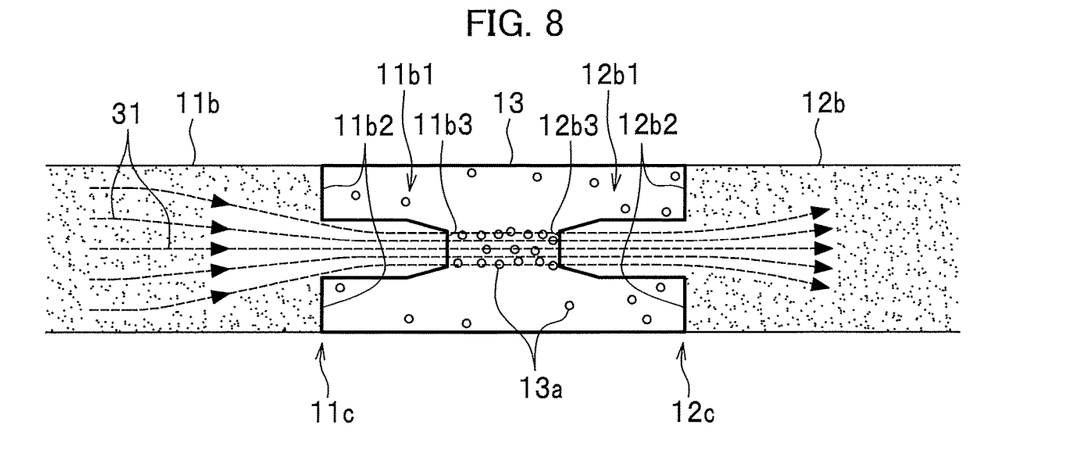
FIG. 8 is a partially-enlarged elevational sectional view to show a part in which the first extending part, the second extending part of the active vibration controller, and the magnetic viscoelastic elastomer elastically connecting the first and second extending parts in the active vibration controller according to a fifth embodiment.

FIG. 8 is an enlarged elevational sectional view to show shapes of the extending part 11b, the second extending part 12b, and the magnetic viscoelastic elastomer 13 according to a fifth embodiment. The active vibration controller 1 according to the fifth embodiment is different from that in the first embodiment in that a tip of the first top portion 11b3 and a tip of the second top portion 12b3 have trapezoid shape on cross section, taken along the transmission direction of the magnetic flux in the extending part 11b and the second extending part 12b.

Accordingly, it is possible to apply the magnetic field to the part in which the magnetic particles 13a are concentrated in the magnetic viscoelastic elastomer 13.

This configuration can make a variation quantity of the magnetic viscoelastic elastomer 13 larger. Further, even though a small power is applied to the exciting coil 14, the magnetic field is generated and applied to the magnetic viscoelastic elastomer 13 efficiently.

Sixth Embodiment

Figure 9:
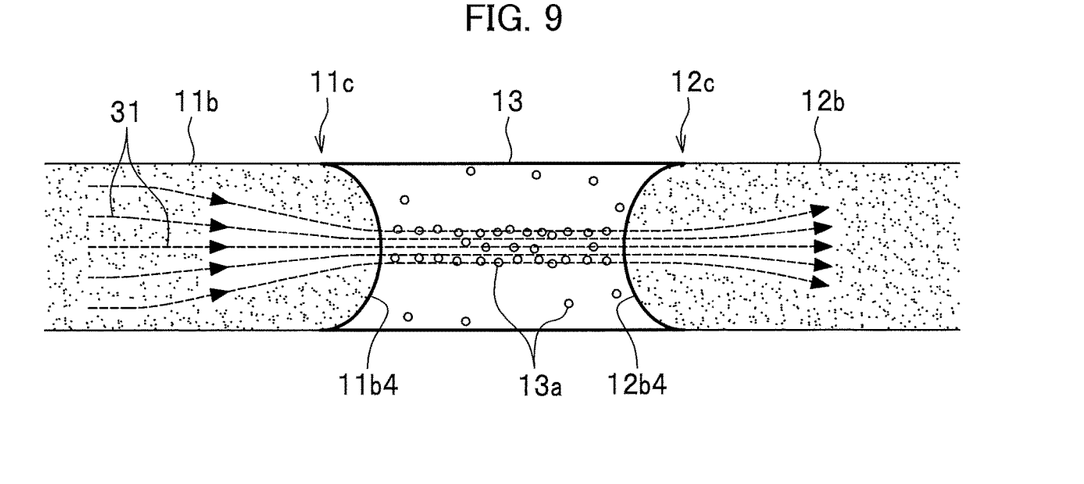
FIG. 9 is a partially enlarged elevational sectional view to show a part in which the first extending part, the second extending part of the active vibration controller, and the magnetic viscoelastic elastomer elastically connecting the first and second extending parts in the active vibration controller according to a sixth embodiment.

FIG. 9 is an enlarged elevational sectional view to show shapes of the first extending part 11b, the second extending part 12b, and the magnetic viscoelastic elastomer 13 according to a sixth embodiment.

The active vibration controller 1 according to the sixth embodiment is different from that in the second embodiment in that the first protruding portion 11b4 and the second protruding portion 12b4 have curved shapes on a cross section taken along the longitudinal direction of each of the top portions.

Accordingly, it is possible to apply the magnetic field to the part in which the magnetic particles 13a are concentrated.

This configuration can make a variation quantity of the magnetic viscoelastic elastomer 13 larger. Accordingly, even though a small quantity of power is applied to the exciting coil 14, this can apply the magnetic field to the magnetic viscoelastic elastomer 13 efficiently.

Seventh Embodiment

Figure 10:
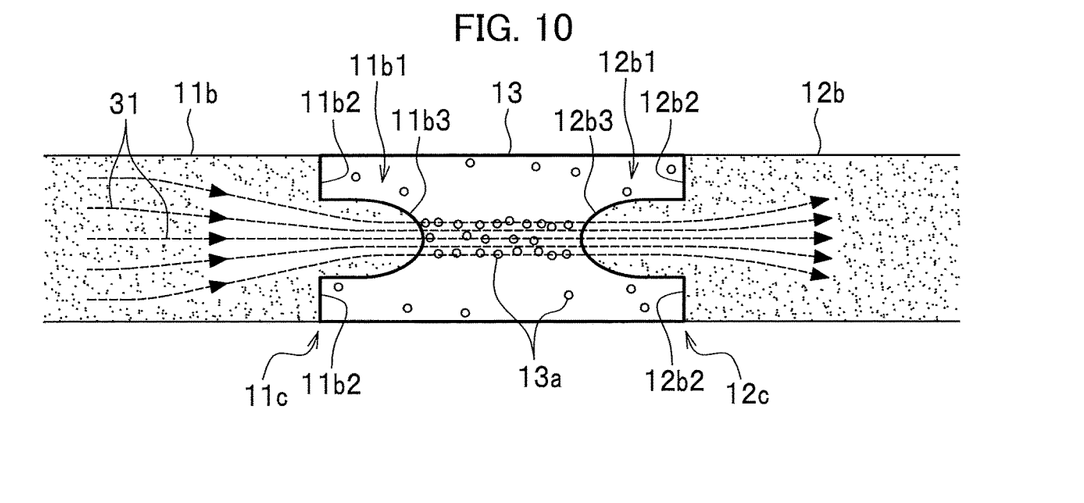
FIG. 10 is a partially-enlarged elevational sectional view to show a part in which the first extending part, the second extending part of the active vibration controller, and the magnetic viscoelastic elastomer elastically connecting the first and second extending parts in the active vibration controller according to a seventh embodiment.

FIG. 10 is an enlarged elevational sectional view to show shapes of the extending part 11b, the second extending part 12b, and the magnetic viscoelastic elastomer 13 according to a seventh embodiment.

The active vibration controller 1 according to the seventh embodiment is different from that in the first embodiment in that shapes of the first top portion 11b3 and the second top portion 12b3 in cross section have curved shapes at the tips of the first top portion 11b3 and the second top portion 12b3.

Accordingly, it is possible to apply the magnetic field to the part in which the magnetic particles 13a are concentrated.

This configuration can make a variation quantity in stiffness of the magnetic viscoelastic elastomer 13 larger. Accordingly, even though a small quantity of power is applied to the exciting coil 14, this can apply the magnetic field to the magnetic viscoelastic elastomer 13 efficiently.

Eighth Embodiment

Figure 11:
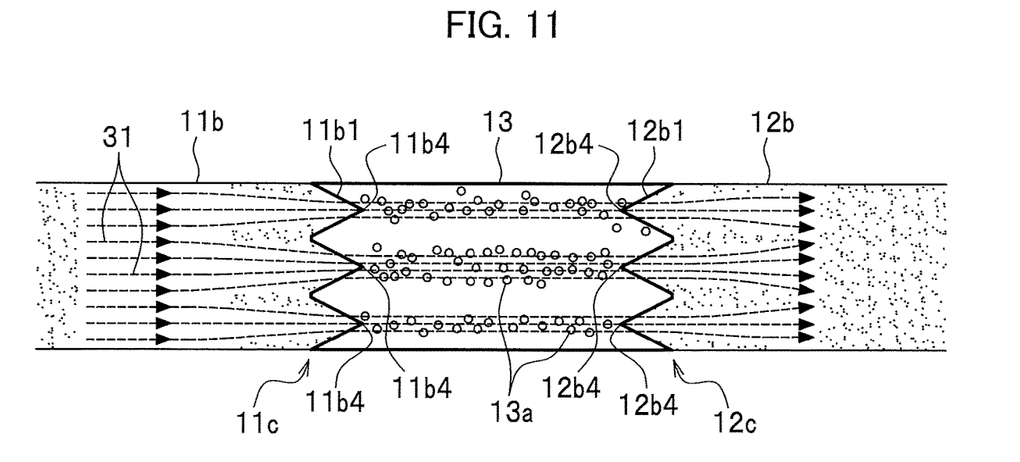
FIG. 11 is a partially-enlarged elevational sectional view to show a part in which the first extending part, the second extending part of the active vibration controller, and the magnetic viscoelastic elastomer elastically connecting the first and second extending parts in the active vibration controller according to an eighth embodiment.

FIG. 11 is an enlarged elevational sectional view to show shapes of the first extending part 11b, the second extending part 12b, and the magnetic viscoelastic elastomer 13.

The active vibration controller 1 according to the eighth embodiment is different from that in the above-described embodiments in that a plurality of parts to which magnetic flux lines are applied in the concentrated manner are formed in the magnetic viscoelastic elastomer 13. Accordingly, a plurality of sets of thin tip portions (the first top portions 11b3, the second top portions 12b3, the first protruding portions 11b4, and the second protruding portions 12b4) are provided to the extending part 11b and the second extending part 12b. The thin tip portions of the extending part 11b are thinner than parts corresponding to the first protruding portions 11b4 at the first base end 11c. The thin tip portions of the extending part 12b are thinner than parts corresponding to the second protruding portions 12b4 at the second base end 12c. The magnetic viscoelastic elastomer 13 has a plurality of paths for transmitting the magnetic field therethrough with a plurality of magnetic powder paths of which interval in the axial direction of the pillar 12a is controlled. FIG. 11 shows an example corresponding to the second embodiment.

This configuration can make a variation quantity of the magnetic viscoelastic elastomer 13 larger.

Ninth Embodiment

Figure 12:
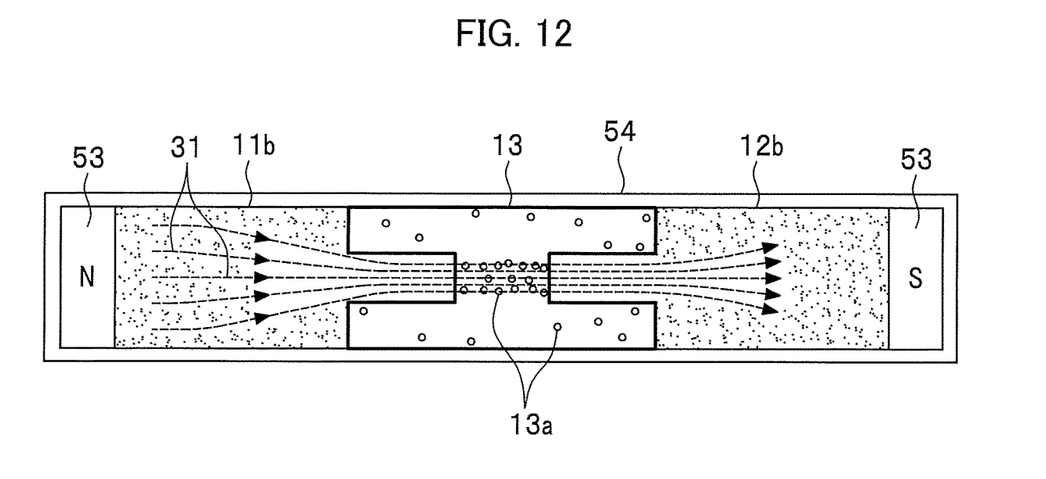
FIG. 12 is an elevational sectional view to explain a manufacturing method of the magnitude viscoelastic elastomer according to the eighth embodiment of the present invention.

FIG. 12 is a sectional view to explain a manufacturing method of the magnetic viscoelastic elastomer according to the ninth embodiment of the present invention. To manufacture the magnetic viscoelastic elastomer 13, a magnetic field generator such as a magnet 53 (or a coil) as a magnetic field generation source is installed in a case 54 made of a non-magnetic member, and between the N pole and the S pole of magnets 52, the extending part 11b and the second extending part 12b are arranged, the magnetic viscoelastic elastomer 13 before solidification with which magnetic powder 13a is mixed is sealed between the extending part 11b and the second extending part 12b. This causes the magnetic field to be focused at and applied to a center of the magnetic viscoelastic elastomer 13. The magnetic viscoelastic elastomer 13 is solidified in such a state that the magnetic particle 13a is concentrated at the center of the magnetic viscoelastic elastomer 13 and connected to the first and second extending parts 11b and 12b through the first and second connecting surfaces 11b1 and 12b1 and first end face 11b2 and the second end face 12b2.

When it is desired to form a region to which magnetic field is concentrated to a plurality of parts of the magnetic viscoelastic, the extending part 11b and the second extending part 12b exemplified in FIG. 11 are used.

In the above-described embodiments, the first base end 11c partially agrees with the end face 11b2, and the second base end 12c partially agrees with the end face 12b2.

In the above-described embodiments, the number of the magnetic viscoelastic elastomers 13 is two. However, one of the magnetic viscoelastic elastomers 13 located at a lower part of the active vibration controller 1 can be omitted because the magnetic field can transmit through the gap between the extending part 11b and the second extending part 12b. However, an elastomer without magnetic powder may be necessary to keep the distance between the extending part 11b and the second extending part 12b. To keep this distance, a bearing can be used.

As described above, there is provided an active vibration controller comprising:

a first magnetic member including a first tip portion extending from a first base end of the first magnetic member and including a first connecting surface extending from the first base end on the first tip portion;

a movable member including a second magnetic member including a second tip portion extending from a second base end of the second magnetic member and a second connecting surface extending from the second base end on the second tip portion;

an exciting coil being coupled to a magnetic circuit including the first and second magnetic members;

a magnetic viscoelastic elastomer that connects the first connecting surface and the second connecting surface to support the second magnetic member relative to the first magnetic member in which a magnetic viscoelastic property varies in accordance with a magnitude of the magnetic field generated by the exciting coil between the first and second tip portions in the magnetic circuit in accordance with an intensity of a current supplied to the exciting coil. The first and second tip portions are thinner than the first and second base ends, respectively. According to this configuration, vibrations externally applied to the first and second magnetic members are controlled via the first magnetic member in which a resonance frequency of the movable member is determined by the viscoelastic property and the intensity of the current. In other words, the first magnetic member outputs a vibration suppression force of which resonance frequency can be controlled in accordance the current supplied to the coil. The movable member may further include an additional mass.

In the above-described embodiments, the exciting coil 14 generates a magnetic field in the second magnetic member 12. The magnetic field circulates the magnetic circuit from the second magnetic core via the second end, the first magnetic core via the first end, and another magnetic viscoelastic elastomer 13 to the second magnetic.

In the above-described embodiments, one side of the magnetic viscoelastic elastomers 13 located at a lower part of the active vibration controller 1 can be omitted because the magnetic field can transmit through the gap between the extending part 11b and the second extending part 12b. However, an elastomer without magnetic powder may be necessary to keep the distance between the extending part 11b and the second extending part 12b. To keep this distance, a bearing can be used.

The invention claimed is:

1. An active vibration controller comprising:
a housing;
a first magnetic member installed on a side of the housing, the first magnetic member including a first tip portion extending from a first base end of the first magnetic member and including a first connecting surface extending from the first base end on the first tip portion;
a movable member including a second magnetic member including a second tip portion extending from a second base end of the second magnetic member and a second connecting surface extending from the second base end on the second tip portion;
an exciting coil that generates a magnetic field in accordance with an intensity of a current supplied thereto;
a magnetic viscoelastic elastomer that has a magnetic viscoelastic property varying in accordance with a magnitude of the magnetic field from the exciting coil between the first and second tip portions, and connects the first connecting surface to the second connecting surface
wherein the first and second tip portions are thinner than parts of the first and second magnetic member at the first and second base ends, respectively.

2. The active vibration controller as claimed in claim 1, wherein the first magnetic member includes a first end face on the first base end on a side of the first tip portion and the first tip portion includes a first top portion protruding from the first end face toward the side of the second tip portion, the first connecting surface covering the first top portion.

3. The active vibration controller as claimed in claim 2, wherein the second magnetic member includes a second end face on the second base end on a side of the second tip portion and the second tip portion includes a second top portion protruding from the second end face toward the side of the first tip portion, the second connecting surface covering the second top portion.

4. The active vibration controller as claimed in claim 3, wherein the second end face is further connected to the magnetic viscoelastic elastomer.

5. The active vibration controller as claimed in claim 2, wherein
the first and second tip portions comprises a plurality of the first and second tip portions extending from the first and second base ends, respectively, the first and second tip portions facing each other, respectively, and wherein,
the first end face is further connected to the magnetic viscoelastic elastomer.

6. The active vibration controller as claimed in claim 2, wherein the first end face is further connected to the magnetic viscoelastic elastomer.

7. The active vibration controller as claimed in claim 1, wherein the first top portion and the second top portion face each other.

8. The active vibration controller as claimed in claim 1, wherein the first tip portion includes a first protruding portion protruding from the first base end toward the second tip portion and having a surface thereof as the first connecting surface.

9. The active vibration controller as claimed in claim 8, wherein the first protruding portion have a curved shape at a surface thereof.

10. The active vibration controller as claimed in claim 9, wherein the second tip portion includes a second protruding portion protruding from the second base end toward the first tip portion as the second connecting surface.

11. The active vibration controller as claimed in claim 10, wherein the first protruding portion and the second protruding portions face each other.

12. The active vibration controller as claimed in claim 8, wherein the second tip portion includes a second protruding portion protruding from the second base end toward the first tip portion and having a surface thereof as the second connecting surface.

13. The active vibration controller as claimed in claim 12, wherein the first protruding portion and the second protruding portions face each other.

14. The active vibration controller as claimed in claim 1, wherein the first magnetic member and the second magnetic member have shapes at the first and second tip portions on cross sections taken along the transmission direction of the magnetic flux have trapezoid shapes in which the first and second tips are tapered, respectively.

* * * * *